United States Patent [19]

d'Hautecourt

[11] 4,348,695
[45] Sep. 7, 1982

[54] NOISE PROCESSOR DEFEAT SWITCH

[75] Inventor: Alain H. d'Hautecourt, Prospect Heights, Ill.

[73] Assignee: Zenith Radio Corporation, Glenview, Ill.

[21] Appl. No.: 205,824

[22] Filed: Nov. 10, 1980

Related U.S. Application Data

[63] Continuation-in-part of Ser. No. 187,222, Sep. 15, 1980, abandoned.

[51] Int. Cl.³ .............................................. H04N 5/14
[52] U.S. Cl. .................................. 358/160; 358/167
[58] Field of Search ............... 358/160, 166, 167, 171, 358/188, 20, 21 R, 36, 37

[56] References Cited

U.S. PATENT DOCUMENTS 4,173,769  11/1979  Van Straaten ........................ 358/20

Primary Examiner—Michael A. Masinick
Attorney, Agent, or Firm—Jack Kail

[57] ABSTRACT

An AC signal processing circuit fabricated on a single integrated circuit chip used in a television receiver is both defeated and the DC level characterizing its output terminal is controlled in response to a manually operable switch communicating with a single input pin of the chip. A control circuit comprising a pair of differential amplifiers fabricated on the chip is responsive to the switch for enabling the AC signal processing circuit or, alternatively, for inhibiting the circuit while simultaneously causing its output to assume a controlled DC level.

11 Claims, 2 Drawing Figures

NOISE PROCESSOR DEFEAT SWITCH

CROSS REFERENCE TO RELATED APPLICATION

This application is a continuation-in-part of application Ser. No. 187,222, filed Sept. 15, 1980, assigned to the assignee of the present application, and now abandoned.

BACKGROUND OF THE INVENTION

The present invention relates to circuits for controlling the operation of AC signal processing circuits used in television receivers and, more particularly, to circuits for defeating the operation of such processing circuits while simultaneously controlling the nature of the signal developed at the output thereof.

Television receivers frequently include circuits designed for processing one or more input AC signals to develop a desired output AC signal. For example, in copending application Ser. No. 179,142, filed Aug. 18, 1980, now U.S. Pat. No. 4,296,435, and assigned to the assignee of the present invention, there is disclosed an AC limiter circuit responsive to an input rectified first derivative signal for developing a corresponding amplitude limited output gate signal, the output gate signal being used to operate a noise processing circuit. At certain times, it is desirable to defeat the operation of the noise processing circuit which may be accomplished by coupling a DC voltage having a particular level to the noise processor circuit in lieu of the output gate signal from the AC limiter. Therefore, in order to defeat the operation of the noise processing circuit, it is necessary to inhibit the development of the gate signal at the output of the AC limiter while simultaneously coupling a DC voltage having a controlled level to the noise processing circuit.

In considering the design of a control circuit capable of performing the above functions, a manually operable switch is preferably provided to allow the viewer to selectively enable or defeat the processed AC output signal, such as the previously referred to gate signal. Moreover, since the electronic circuitry used in modern television receivers is largely fabricated in the form of integrated circuit chips, it is necessary to interconnect the manually operable function selector switch with the pins of the integrated circuit chip embodying the AC signal processing circuit. This interconnection is preferably effected using a minimum number of integrated circuit chip pins since the number of input/output pins is a major factor in determining the cost of a chip. It is accordingly a primary object of the present invention to provide a novel control circuit responsive to a manually operable selector switch for defeating the operation of an AC signal processing circuit embodied on an integrated circuit chip while simultaneously controlling the nature of the signal developed at the output thereof. It is a further object of the invention to provide a control circuit of the foregoing type which is embodied on the integrated circuit chip together with the AC signal processing circuit and which interfaces with the manually operable selector switch through a single integrated circuit chip pin.

BRIEF DESCRIPTION OF THE DRAWINGS

Further objects and advantages of this invention will be apparent from reading the following specification in conjunction with the drawings in which.

DESCRIPTION OF THE PREFERRED EMBODIMENT

Figure 1:
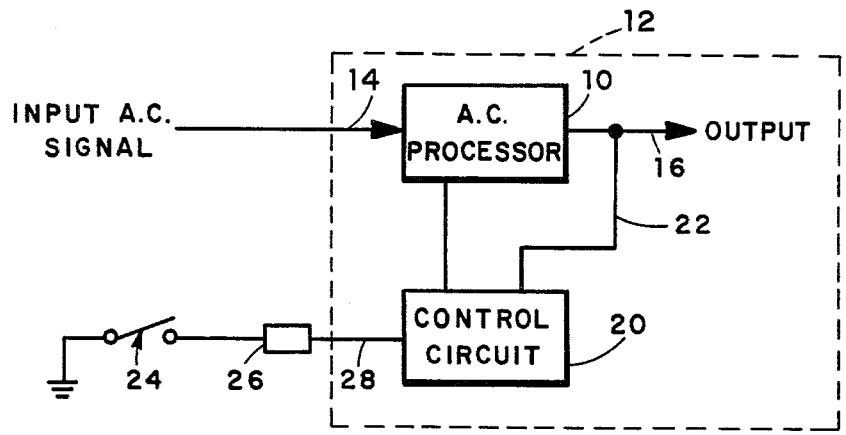
FIG. 1 is block diagram illustrating an AC signal processing circuit operated by a control circuit constructed according to the present invention.

Referring to the drawings, FIG. 1 illustrates the operation of the present invention on a block diagram level. As illustrated, an AC signal processor 10 fabricated on an integrated circuit chip 12 receives an input AC signal over a conductor 14. The input AC signal developed on conductor 14, which may be supplied from a point internal or external of chip 12, is processed in some particular manner by AC signal processor 10 which develops a processed AC output signal on an output conductor 16. AC signal processor 10 includes an additional output conductor 18 on which is developed a constant level current signal enabling operation of the processor. Except for the foregoing limitations, the precise nature of AC signal processor 10 is not intended to impose any limitations on the invention whereby the processor may assume any of a number of circuit configurations. For example, as will be described with reference to FIG. 2, AC signal processor 10 may comprise an amplitude limiter used to control a noise processing circuit in a television receiver.

With further reference to FIG. 1, conductor 18 of AC signal processor 10 is connected to a control circuit 20, also fabricated on integrated circuit chip 12, control circuit 20 also being connected to output conductor 16 of the AC signal processor by a conductor 22. A manually operable switch 24, located externally of integrated circuit chip 12, is connected between a source of ground potential and an input pin 26 of integrated circuit chip 12, pin 26 being connected to the input of control circuit 20 by a conductor 28.

As previously described, when enabled by the constant level current signal developed on conductor 18, AC signal processor 10 is operative for developing a processed output AC signal on conductor 16. The AC signal developed on conductor 16 is then used to appropriately control the operation of other circuits normally also fabricated on integrated circuit chip 12. In accordance with the present invention, this normal mode of operation of AC signal processor 10 is realized when switch 24 is open as shown in the drawings whereby control circuit 20 operates as a current sink for enabling the development of the constant level current signal in conductor 18. Also, in this mode of operation, conductor 22 has no effect on the processed AC signals developed on output conductor 16. In certain instances, it may become desirable to defeat the operation of AC signal processor 10 and develop a DC signal on output conductor 16 having a controlled level in lieu of the processed AC signal which would otherwise be developed on the output conductor. This mode of operation is achieved by closing switch 24 whereby control circuit 20 is operated for inhibiting the development of the constant level current signal in conductor 18 thereby rendering AC signal processor 10 inoperable. At the same time, control circuit 20 causes an appropriate signal to be developed on conductor 22 for developing a controlled DC signal on output conductor 16. In this manner, a controlled DC signal is developed on output conductor 16 in lieu of the processed AC output signal.

Figure 2:
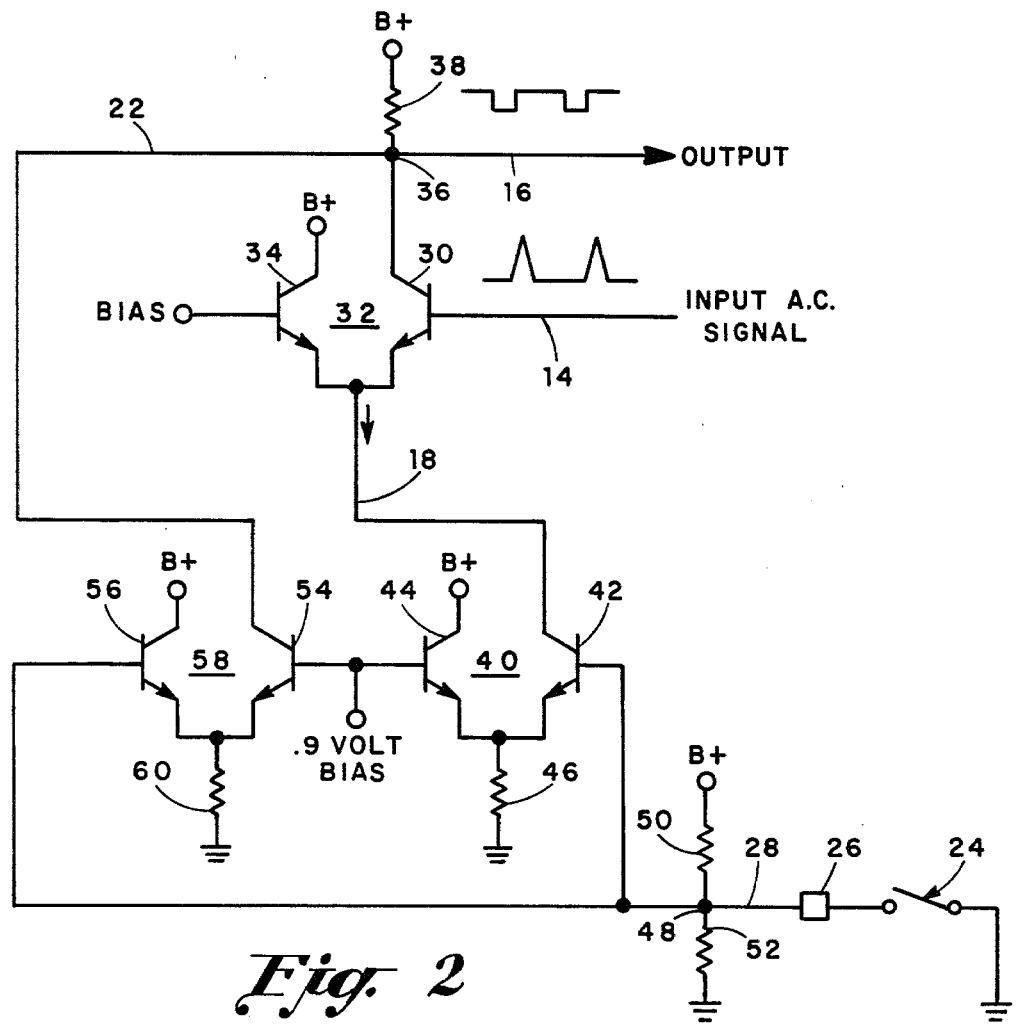
FIG. 2 is a detail electrical schematic diagram illustrating an exemplary AC signal processing circuit and a preferred embodiment of the control circuit of the invention.

FIG. 2 illustrates an exemplary form of AC signal processor 10 which comprises an AC amplitude limiter which is used in a television receiver for controlling the operation of a noise processing circuit. The noise processing circuit is disclosed in detail in copending application Ser. No. 179,142 filed Aug. 18, 1980, and assigned to the assignee of the present invention, which application is incorporated herein by reference. In this example, the input AC signal developed on conductor 14 comprises a series of signal spikes representing the rectified first derivative of the low pass luminance signal developed in the receiver. This input AC signal is normally processed by the limiter and developed as an amplitude limited gating signal on output conductor 16 for controlling the noise processing circuit. More specifically, the input AC signal is coupled to the base of a first transistor 30 of a differential amplifier 32. Differential amplifier 32 comprises a second transistor 34, the emitters of transistors 30 and 34 being connected in common to conductor 18. The base of transistor 34 is connected to a source of bias potential, preferably on the order of about 3 volts, while the collector of the transistor is connected to a source of supply voltage B+. The collector of transistor 30 is connected through a node 36 to output conductor 16, node 36 also being connected through a resistor 38 to supply voltage B+.

Control circuit 20 comprises a first differential amplifier 40 consisting of a pair of transistors 42 and 44, the emitters of transistors 42 and 44 being connected in common through an emitter resistor 46 to ground potential. The collector of transistor 42 is connected to conductor 18 while its base is connected to integrated circuit chip pin 26 through input conductor 28. Input conductor 28 is also connected to a node 48 formed between a pair of resistors 50 and 52 comprising a voltage divider connected between supply voltage B+ and ground potential. Resistors 50 and 52 are preferably selected such that a DC voltage of about 1.8 volts is developed at node 48 when switch 24 is in its open position.

The collector of transistor 44 is connected to supply voltage B+ and the base of transistor 44 is connected to a source of bias potential which is preferably on the order of about 0.9 volts. This bias potential is also coupled to the base of a transistor 54 forming another differential amplifier 58 in conjunction with a second transistor 56, the emitters of transistors 54 and 56 being connected in common through an emitter resistor 60 to ground potential. The collector of transistor 54 is connected to conductor 22 while the collector and base terminals of transistor 56 are connected to supply voltage B+ and pin 26 respectively.

The normal mode of operation of the amplitude limiter is achieved by placing switch 24 in its open position as illustrated in the drawings. In this case, the voltage developed at node 48, which is greater than the bias potential coupled to the bases of transistors 44 and 54, renders transistors 42 and 56 conductive while transistors 44 and 54 are reverse biased to non-conducting states. Transistor 42 in association with emitter resistor 46 consequently acts as a constant current sink for enabling the development of a constant level current signal on conductor 18 thereby enabling the operation of the limiter circuit. Since transistor 54 is non-conductive in this mode of operation, no current is developed in conductor 22 which therefore has no effect on the signals developed on output conductor 16. The amplitude limiter comprising differential amplifier 32 is therefore enabled for converting the signal spikes developed on input conductor 14 to an output gating signal on conductor 16 in a conventional manner.

When switch 24 is closed pin 26 and the bases of transistors 42 and 56 are effectively coupled to ground potential. As a consequence, transistors 44 and 54 are now rendered conductive each developing an emitter voltage of about 0.2 volts for reverse biasing transistors 42 and 56 into non-conductive states. Since transistor 42 is non-conductive no current is developed in conductor 18 whereby the operation of the amplitude limiter comprising differential amplifier 32 is inhibited. As a result, no current is developed in the collector of transistor 30 so that, except for the effect introduced by transistor 54 and its emitter resistor 60, output conductor 16 would be held at a DC voltage level corresponding to the supply voltage B+. However, since transistor 54 is conductive during this mode of operation current is drawn through conductor 22 and the DC voltage level on output conductor 16 is reduced by an amount controlled by the resistance of resistor 60. Therefore, a DC voltage whose level is controllable by the selection of resistor 60 is developed on output conductor 16 in lieu of the gating signal normally produced. In the particular example discussed herein, this controllable DC voltage is used to defeat the operation of the previously mentioned noise processing circuit.

What has thus been shown is a novel circuit for controlling the operation of an AC signal processing circuit embodied on an integrated circuit chip in response to a manually operable selector switch which interfaces with the integrated circuit chip through a single input pin. In a normal mode of operation, the AC signal processing circuit is enabled for converting input AC signals into processed output AC signals. In a second mode of operation, the AC signal processor is disabled while a controlled DC voltage is developed at its output.

While a particular embodiment of the present invention has been shown and described, it will be apparent that changes and modifications may be made therein without departing from the invention in its broader aspects. The aim of the appended claims, therefore, is to cover all such changes and modifications as fall within the true spirit and scope of the invention.

What is claimed is:

1. In a television receiver of the type having an AC signal processing circuit including an output terminal and means enableable for developing a constant level current signal for rendering said processing circuit operative, the improvement comprising:

switch means having a single output conductor, said switch means being selectively operable for developing only a first control signal or only a second control signal on said single output conductor; and control means connected to said single output conductor and operable in response to said first control signal for enabling the development of said constant level current signal and operable in response to said second control signal for inhibiting the development of said constant level current signal while causing said output terminal to assume a controlled DC voltage level.

2. The improvement according to claim 1 wherein said AC signal processing circuit and said control means are fabricated on a single integrated circuit chip and wherein said switch means comprises a manually operable two position switch having a single output conductor connected to said control means through a single input pin of said integrated circuit chip.

3. The improvement according to claim 2 wherein said switch means comprises a voltage divider fabricated on said single integrated circuit chip, said voltage divider having a node connected to said input pin for developing said first and second control signals in response to operation of said two position switch.

4. The improvement according to claim 1 wherein said control means comprises first differential amplifier means responsive to said first control signal for enabling the development of said constant level current signal and responsive to said second control signal for inhibiting the development of said constant level current signal.

5. The improvement according to claim 4 wherein said control means comprises second differential amplifier means responsive to said second control signal for causing said output terminal to assume a selected DC voltage level, said second differential amplifier means having no effect on said output terminal in response to said first control signal.

6. The improvement according to claim 4 wherein said first differential amplifier means comprises first and second transistors each having an emitter coupled to ground through a first common resistance, said first transistor having a collector coupled to said processing circuit for developing said constant level current signal and a base coupled to said single output conductor, said second transistor having a collector coupled to a source of DC supply voltage and a base coupled to a bias potential, said first control signal having a value greater than said bias potential and said second control signal having a value less than said bias potential, whereby said first transistor is conductive and said second transistor is non-conductive in response to said first control signal for enabling the development of said constant level current signal and said first transistor is non-conductive and said second transistor is conductive in response to said second control signal for inhibiting the development of said constant level current signal.

7. The improvement according to claim 5 wherein said second differential amplifier means comprises first and second transistors each having an emitter coupled to ground through a first common resistance, said first transistor having a collector coupled to said output terminal and a base coupled to a bias potential, said second transistor having a collector coupled to a source of DC supply voltage and a base coupled to said single output conductor, said first control signal having a value greater than said bias potential and said second control signal having a value less than said bias potential, whereby said first transistor is conductive and said second transistor is non-conductive in response to said second control signal for controlling the DC voltage level characterizing said output terminal and said first transistor is non-conductive and said second transistor is conductive in response to said first control signal such that said second differential amplifier means has no effect on said output terminal.

8. In a television receiver of the type having an AC signal processing circuit including an output terminal and means enableable for developing a constant level current signal for rendering said processing circuit operative, the improvement comprising:

manually operable switch means having a single output conductor and at least two different operational states, said single output conductor developing a first control signal in response to a first state of said switch means and a second control signal in response to a second state of said switch means;

an integrated circuit chip having an input pin connected to said single output conductor; and control means fabricated on said integrated circuit chip and having a single input connected to said input pin, said control means being operable in response to said first control signal for enabling the development of said constant level current signal and operable in response to said second control signal for inhibiting the development of said constant level current signal while controlling the DC voltage level characterizing said output terminal.

9. The improvement according to claim 8 including a voltage divider fabricated on said integrated circuit chip and having a node connected between said input pin and said control means input for developing said first and second control signals in response to operation of said switch means.

10. The improvement according to claim 9 wherein said control means comprises first differential amplifier means comprising first and second transistors each having an emitter coupled to ground through a first common resistance, said first transistor having a collector coupled to said processing circuit for developing said constant level current signal and a base coupled to said voltage divider node, said second transistor having a collector coupled to a source of DC supply voltage and a base coupled to a bias potential, said first control signal having a value greater that said bias potential and said second control signal having a value less than said bias potential, whereby said first transistor is conductive and said second transistor is non-conductive in response to said first control signal for enabling the development of said constant level current signal and said first transistor is non-conductive and said second transistor is conductive in response to said second control signal for inhibiting the development of said constant level current signal.

11. The improvement according to claim 9 wherein said control means comprises second differential amplifier means comprising first and second transistors each having an emitter coupled to ground through a second common resistance, said first transistor having a collector coupled to said output terminal and a base coupled to a bias potential, said second transistor haaving a collector coupled to a source of DC supply voltage and a base coupled to said voltage divider node, said first control signal having a value greater than said bias potential and said second control signal having a value less than said bias potential, whereby said first transistor is conductive and said second transistor is non-conductive in response to said second control signal for controlling the DC voltage level characterizing said output terminal and said first transistor is non-conductive and said second transistor is conductive in response to said first control signal such that said second differential amplifier means has no effect on said output terminal.

* * * * *